US008769929B2

(12) United States Patent
Weber

(10) Patent No.: US 8,769,929 B2
(45) Date of Patent: Jul. 8, 2014

(54) EXHAUST SYSTEM WITH A $NO_x$ SENSOR

(75) Inventor: David Charles Weber, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/603,273

(22) Filed: Sep. 4, 2012

(65) Prior Publication Data
US 2012/0330539 A1    Dec. 27, 2012

Related U.S. Application Data

(62) Division of application No. 12/423,706, filed on Apr. 14, 2009, now Pat. No. 8,256,205.

(51) Int. Cl.
*F01N 3/00* (2006.01)
*F01N 3/10* (2006.01)
*F01N 3/02* (2006.01)
*F01N 1/00* (2006.01)
*F01N 3/20* (2006.01)
*F01N 3/22* (2006.01)
*F01N 3/30* (2006.01)

(52) U.S. Cl.
CPC *F01N 3/208* (2013.01); *F01N 3/22* (2013.01); *F01N 3/225* (2013.01); *F01N 3/30* (2013.01); *F01N 2560/025* (2013.01); *F01N 2560/026* (2013.01)
USPC ............ 60/276; 60/274; 60/287; 60/301; 60/317; 60/324

(58) Field of Classification Search
CPC ........... F01N 3/208; F01N 3/22; F01N 3/225; F01N 3/30; F01N 3/306; F01N 2560/025; F01N 2560/026
USPC ........... 60/274, 276, 287, 289, 290, 292, 301, 60/317, 320, 324
See application file for complete search history.

(56) References Cited

U.S. PATENT DOCUMENTS

| 4,532,013 | A | 7/1985 | Dietz et al. |
|---|---|---|---|
| 5,845,625 | A | 12/1998 | Kidokoro et al. |
| 6,311,480 | B1 | 11/2001 | Suzuki et al. |
| 6,347,513 | B2 | 2/2002 | Pfleger et al. |
| 6,383,354 | B1 | 5/2002 | Kurokawa et al. |
| 7,610,142 | B1 | 10/2009 | Hoard et al. |
| 2001/0042536 | A1 * | 11/2001 | Borland ..................... 123/298 |
| 2003/0070472 | A1 | 4/2003 | Tsukamoto et al. |
| 2008/0127633 | A1 | 6/2008 | Kesse et al. |
| 2009/0151425 | A1 | 6/2009 | Miwa |

FOREIGN PATENT DOCUMENTS

KR    2006069906 A  *  6/2006   .............. F01N 7/10

* cited by examiner

*Primary Examiner* — Audrey K Bradley
(74) *Attorney, Agent, or Firm* — Julia Voutyras; Alleman Hall McCoy Russell & Tuttle LLP

(57) ABSTRACT

Various systems and methods are described for controlling a NOx sensor coupled to an engine exhaust system in a motor vehicle. One example method comprises generating an offset of the sensor based on an ambient air flow drawn into the exhaust system, the ambient air flow having circumvented cylinders of the engine, and adjusting an output of the sensor based on the generated offset.

9 Claims, 8 Drawing Sheets

EXHAUST SYSTEM WITH A $NO_x$ SENSOR

CROSS REFERENCE TO RELATED APPLICATIONS

The present application is a divisional of U.S. patent application Ser. No. 12/423,706 filed Apr. 14, 2009, now U.S. Pat. No. 8,256,205, the entire contents of which are incorporated herein by reference for all purposes.

TECHNICAL FIELD

The present application relates generally to an exhaust system of an engine having an exhaust gas sensor for detecting exhaust components, such as nitrogen oxides ($NO_x$).

BACKGROUND AND SUMMARY

When new, gain and offset of exhaust gas sensors such as $NO_x$ sensors may be determined in order to calibrate the sensor so that accurate measurements of exhaust gas constituents may be obtained. Over time, however, sensor parameters can drift resulting in measurement error. For example, a sensor gain and offset, which are calibration parameters used to define a linear transformation from sensor output to a measured parameter, may drift during sensor operation. Thus, periodic updates of the sensor parameters, including sensor gain and offset, during the lifetime of the sensor may be used.

One approach to periodically update $NO_x$ sensor offset is disclosed in U.S. Pat. No. 6,311,480. In the cited reference, a deviation of an output value (e.g., an offset) of a $NO_x$ sensor from a reference output value (e.g., $NO_x$ concentration of ambient air) is determined when the engine is under selected operating conditions which may include engine idling, low-load operation, and fuel cut operation. During such operating conditions, $NO_x$ concentration in the exhaust gases in the vicinity of the sensor decreases to a value that is substantially zero (e.g., $NO_x$ concentration of ambient air). As such, a deviation of the output value of the $NO_x$ sensor from an output value corresponding to zero $NO_x$ concentration corresponds to a drift in the offset of the sensor, and subsequent $NO_x$ readings may be adjusted based on the offset. Thus, accurate $NO_x$ readings may be obtained despite offset deviations.

The location of the $NO_x$ sensor, however, may affect $NO_x$ concentration during engine operating conditions described above, such as during fuel cut operation (e.g., deceleration fuel shut off, DFSO). For example, if the sensor is located downstream of a $NO_x$ storage catalyst, exhaust gases reach the sensor only after exiting the catalyst. There is a chance $NO_x$ may exit the catalyst in the exhaust stream in some situations including when the catalyst has not warmed up and when the catalyst has degraded. In such a situation, the approach disclosed in the above reference would yield an inaccurate $NO_x$ offset which may lead to an increase in $NO_x$ emissions.

The inventor herein has recognized the above problems and has devised an approach to address them. Thus, a method for generating an offset of a $NO_x$ sensor downstream of a catalyst is disclosed. The method comprises generating an offset of the sensor based on an ambient air flow drawn into the exhaust system, the ambient airflow having circumvented cylinders of the engine, and adjusting an output of the sensor based on the generated offset.

Specifically, in one example, an ambient ram air flow that is absent of exhaust emissions is selectively drawn into the exhaust system through a valved bypass and the ram air flows past the $NO_x$ sensor. In this manner, an accurate $NO_x$ offset of the sensor may be periodically generated in order to maintain and/or reduce $NO_x$ emissions, even if the $NO_x$ sensor is positioned downstream of a catalyst.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a method for controlling a $NO_x$ sensor coupled to an engine exhaust system in a motor vehicle wherein a control system is configured to control the air stream flowing past the sensor, to identify an offset of the $NO_x$ sensor during a first mode of operation, and to identify an adjusted exhaust $NO_x$ amount during a subsequent second mode of operation. In the first mode of operation, a valve of a bypass connected to an auxiliary branch of the exhaust pipe positioned downstream of a $NO_x$ catalyst is opened, thus allowing a ram air flow to be drawn into the engine exhaust. Because the ram air flow is comprised of ambient air which is substantially absent of exhaust emissions, an accurate ambient $NO_x$ amount (e.g., an offset) may be generated. Further, since the measurement in not dependent on specific operating conditions such as DFSO, the offset may be generated periodically throughout a drive cycle, even while engine combustion is carried out, as desired. For example, a $NO_x$ offset may be generated every ten miles during a drive cycle.

Figure 1:
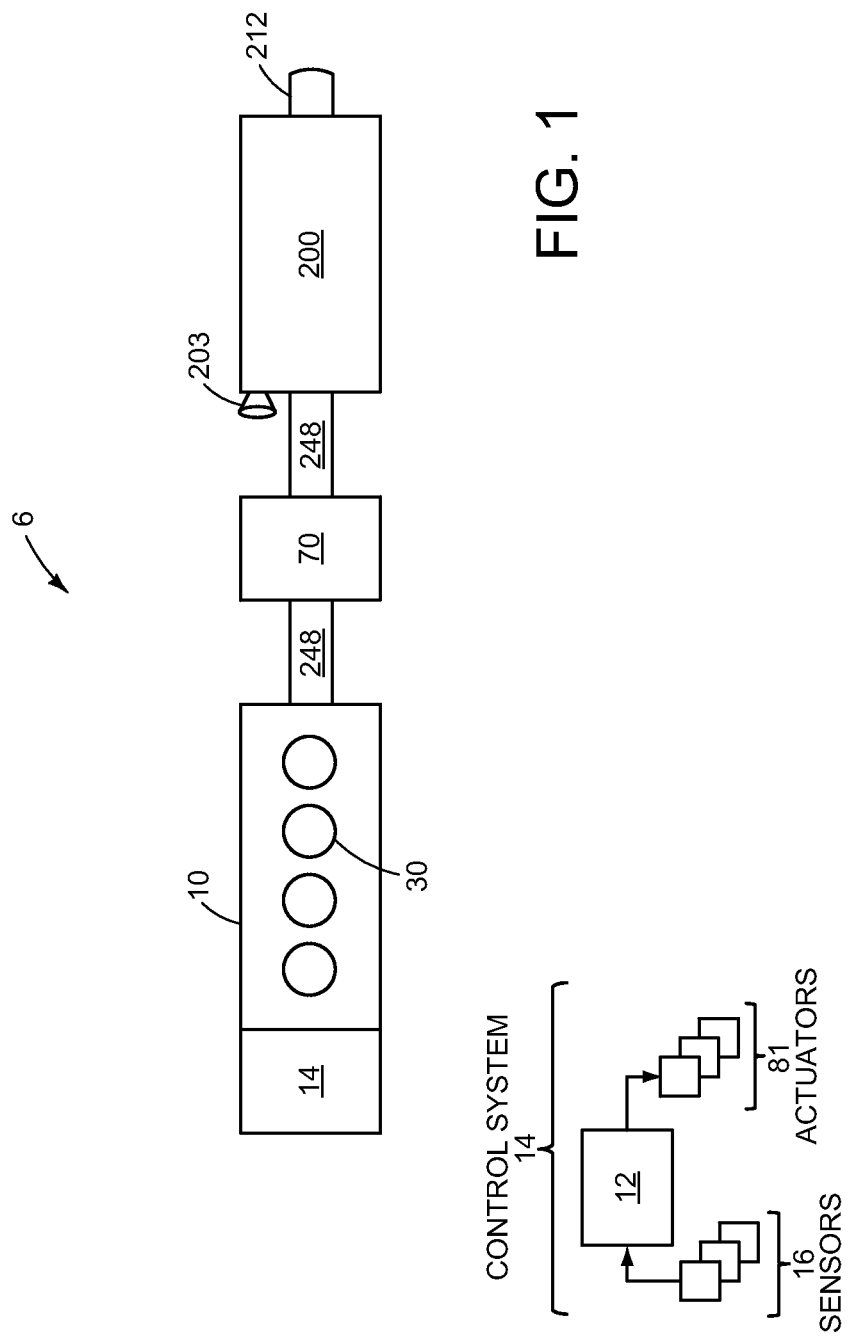
FIG. 1 shows a schematic diagram of engine and an associated exhaust system.

FIG. 1 shows a schematic diagram of a vehicle system 6. The vehicle system 6 includes an engine 10 which may be included in a propulsion system of an automobile, the engine 10 having a plurality of cylinders 30. Engine 10 may be controlled at least partially by a control system 14 including controller 12 and by input from a vehicle operator via an input device (not shown in FIG. 1). The vehicle system 6 includes an exhaust passage 248 eventually leading to a tailpipe 212 that routes exhaust gas to the atmosphere. The exhaust passage 248 of vehicle system 6 includes a section 200 including a valved bypass with an ambient air inlet 203, as will be described with reference to FIGS. 2 and 3.

Engine 10 is shown coupled to exhaust passage 248 upstream of emission control device 70. Device 70 may be a diesel particulate filter (DPF), a three way catalyst (TWC), a $NO_x$ trap, $NO_x$ catalyst, various other emission control devices, or combinations thereof. As an example, device 70 may be a selective catalyst reduction (SCR) system which operates to reduce $NO_x$ emissions by introducing a reductant, such as urea, into the exhaust gas stream. In some embodiments, during operation of engine 10, emission control device 70 may be periodically reset by operating at least one cylinder of the engine within a particular air/fuel ratio.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include an exhaust gas sensor located in exhaust passage 248 downstream of emission control device 70. Additionally, other sensors such as pressure, temperature, air-fuel ratio, and composition sensors may be coupled to various locations in the vehicle system 6. As another example, the actuators may include actuators for fuel injectors (not shown), control valves (as shown in FIGS. 2-4), and a throttle (not shown).

The control system 14 may include a controller 12. The controller 12 may be a microcomputer including the following, although not shown in FIG. 1: a microprocessor unit, input/output ports, an electronic storage medium for executable programs and calibration values (e.g., a read only memory chip), random access memory, keep alive memory, and a data bus. Storage medium read-only memory may be programmed with computer readable data representing instructions executable by the microprocessor for performing the methods described below as well as other variants that are anticipated but not specifically listed. For example, the controller may receive communication (e.g., input data) from the various sensors, process the input data, and trigger the actuators in response to the processed input data based on instruction or code programmed therein corresponding to one or more routines. Example routines are described herein with reference to FIGS. 5-8.

Figure 2:
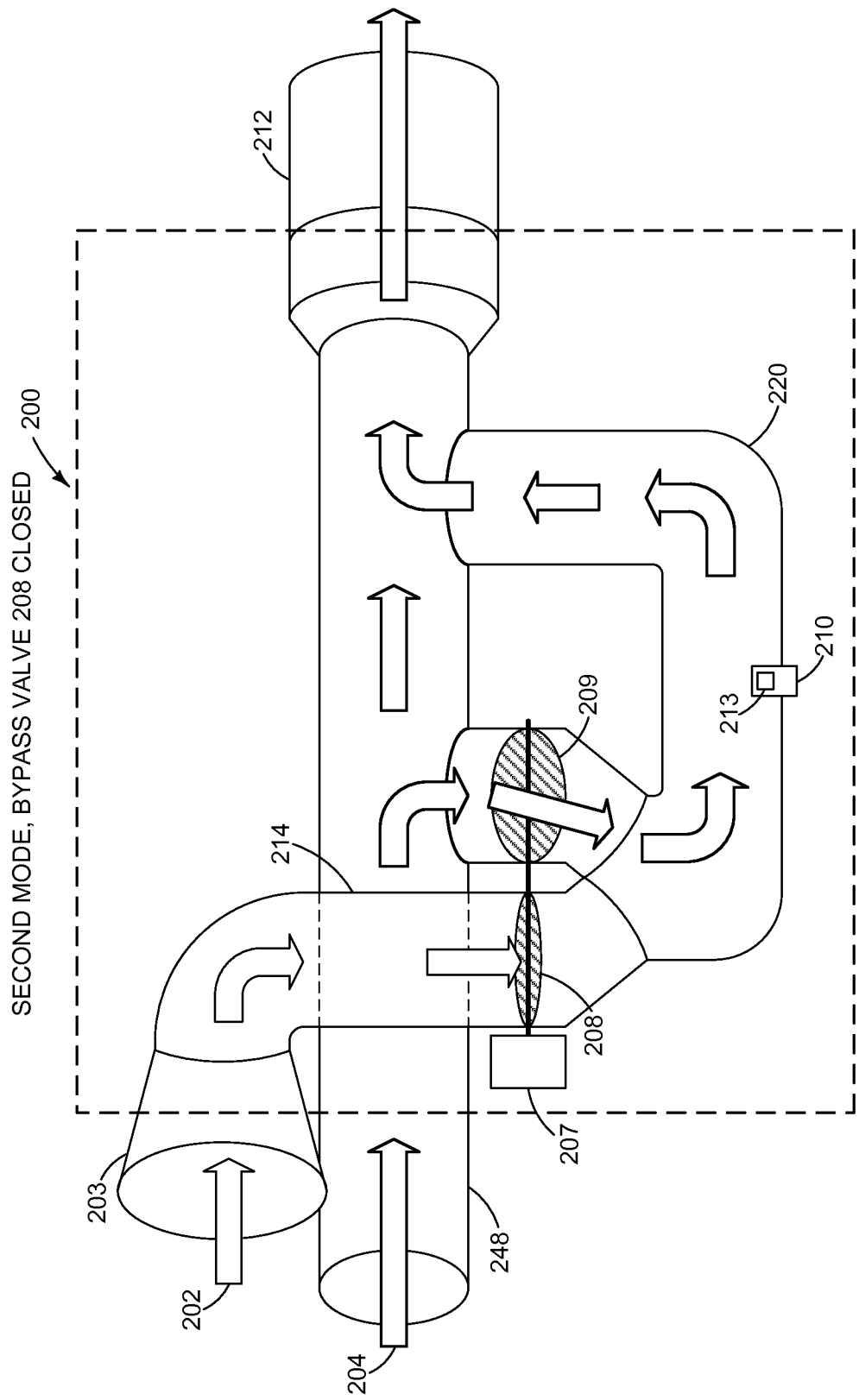
FIG. 2 shows a schematic diagram of an exhaust system including a valved bypass.
Figure 3:
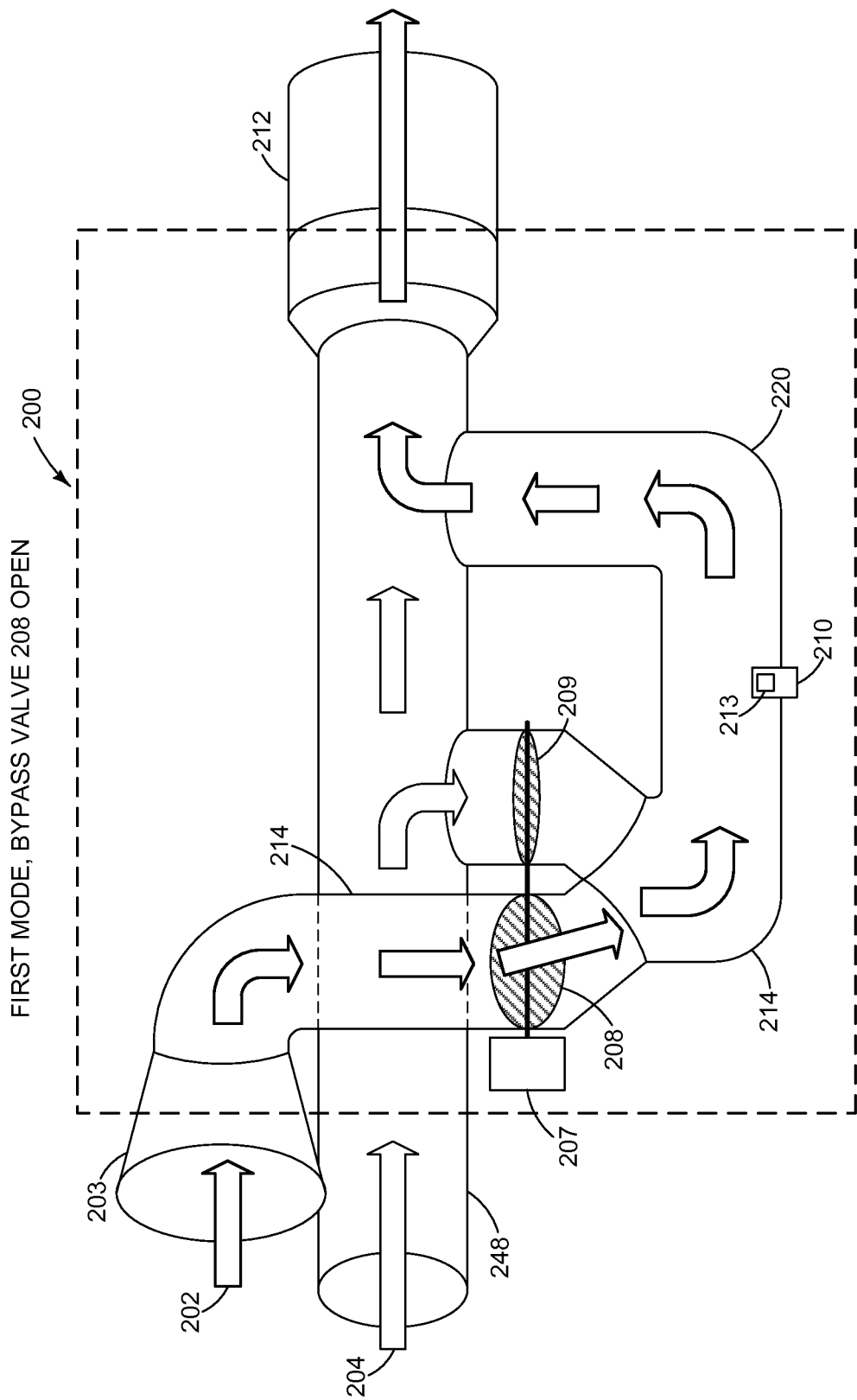
FIG. 3 shows a schematic diagram of an exhaust system including a valved bypass.
Figure 4:
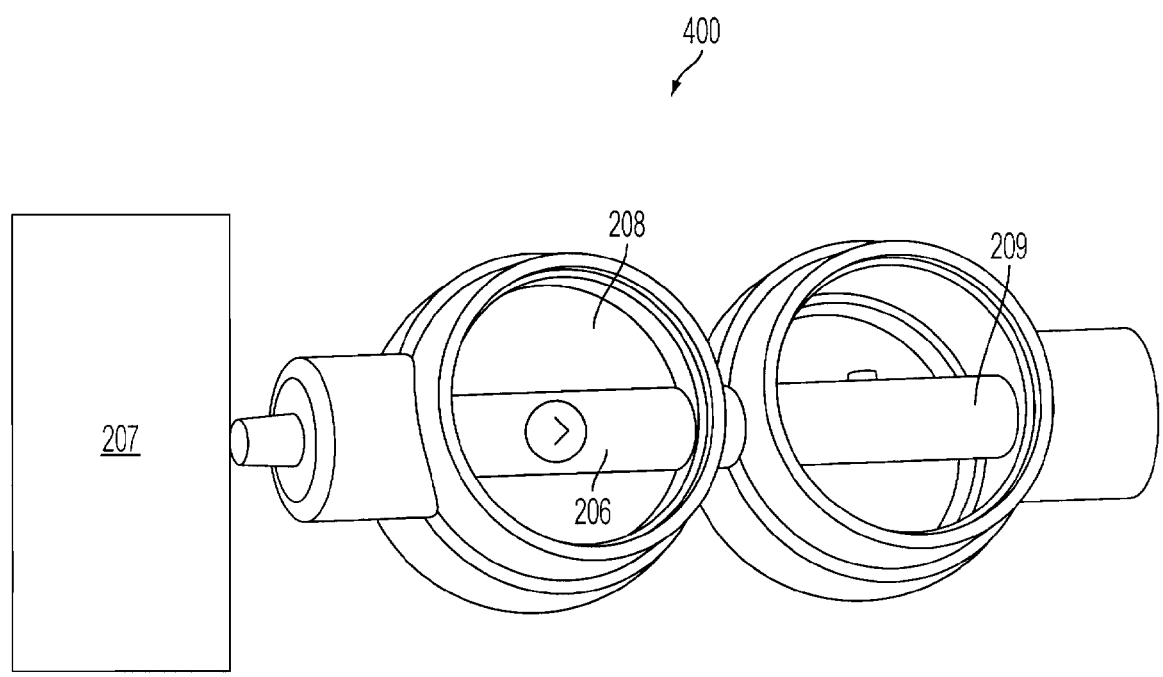
FIG. 4 shows a schematic diagram of a dual valve.

FIGS. 2 and 3 a show section 200 of exhaust pipe 248 including a valved bypass. Exhaust pipe 248 is divided into a main branch and an auxiliary branch 220 downstream of an emission control device such as an SCR (not shown in FIGS. 2 and 3). As shown, auxiliary branch 220 rejoins the main branch of the exhaust pipe 248 at a location further downstream of the emission control device and before exhaust gas is emitted to the atmosphere through tailpipe 212. The auxiliary branch 200 may alternatively have its own tailpipe exit, as in a dual tipped tailpipe exhaust (not shown).

Auxiliary branch 220 is coupled to a bypass 214 that does not intersect the main branch of exhaust pipe 248. The distal end of bypass 214 is an ambient air inlet 203 which is configured to operate as a ram air scoop. In this example, the ambient air inlet is positioned so that it opens towards the front end of the vehicle. As such, when the vehicle is in motion, ambient air may be "scooped", or rammed, into the ambient air inlet 203 and the ambient air is directed to flow through the bypass 214 as indicated at 202 in FIGS. 2 and 3.

Bypass 214 further includes a valve 208 and a valve actuator 207. Valve 208 is one valve of a dual valve, an example of which is illustrated in FIG. 4. FIG. 4 shows a dual valve 400 connected to a valve actuator 207. Dual valve 400 has a first valve 208 and a second valve 209. Valves 208 and 209 are connected to actuator 207 by a single shaft 206 and are positioned at different angles along the shaft. As shown in FIG. 4, the valves are positioned 90 degrees apart along the shaft such that when valve 208 is completely closed, valve 209 is completely open, and vice versa. Actuator 207 is configured to rotate the shaft and move the valves to one of two states: completely open or completely closed. Although the valves are positioned 90 degrees apart in this example, the valves may be positioned at various angles along the shaft in order to accommodate having one valve completely open and the other valve completely closed.

Turning back to FIG. 2, bypass valve 208 is positioned in the completely closed state. The second valve 209 of the dual valve, which is located in the auxiliary branch 220, is thus in the completely open state. In this configuration, the ram air flow 202 that is scooped into the bypass is prevented from entering the auxiliary branch 220 of the exhaust pipe. Exhaust gases that exit the emission control device, however, are allowed to flow past valve 209 and through the auxiliary branch 220 of the exhaust in addition to flowing through the main branch of the exhaust pipe 248.

A variety of exhaust gas sensors may be located in the auxiliary branch 220. For example, sensor 210 may have a heater 213, and may be a $NO_x$ sensor determining an amount of $NO_x$ in the emissions. In some embodiments, there may be more than one sensor located in the auxiliary branch of the exhaust pipe. When the auxiliary valve 209 is in the completely open state and the bypass valve 208 is in the completely closed state, exhaust gases 204 are directed to flow past the $NO_x$ sensor 210 and the concentration of $NO_x$ in the exhaust gases may be determined. A second configuration is illustrated in FIG. 3 in which the bypass valve 208 is in the completely open state and the auxiliary valve 209 is in the completely closed state. In the configuration of FIG. 3, exhaust gases 204 are prevented from entering the auxiliary branch 220. Instead, the ram air flow 202, which is comprised of ambient air that has not traveled through the engine, is directed to flow through the auxiliary branch 220 and past the $NO_x$ sensor 210. As such, $NO_x$ readings that are generated while the bypass valve 208 is open correspond to an offset of the $NO_x$ sensor.

Figure 5:
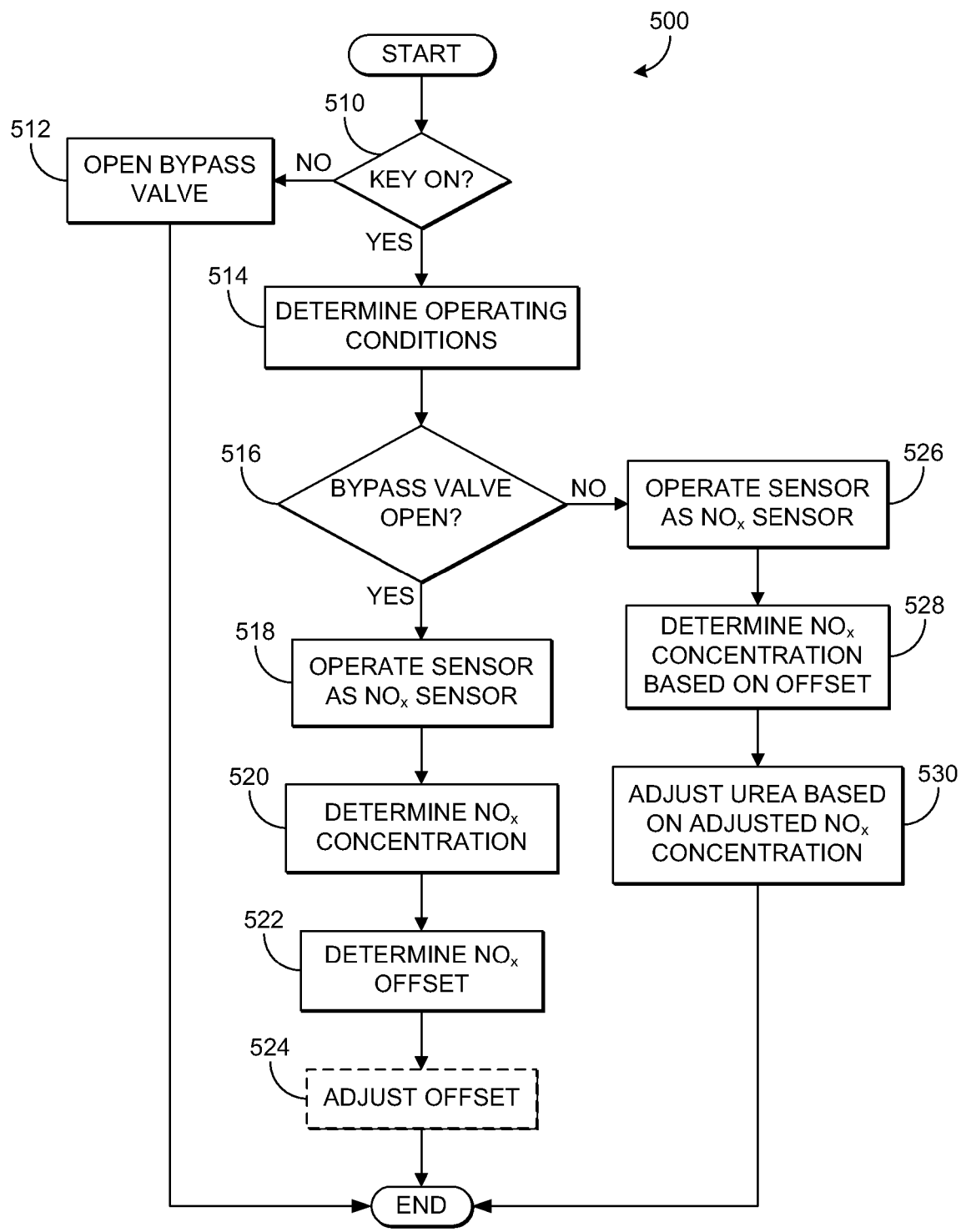
FIG. 5 shows a flow chart illustrating a routine for estimating $NO_x$ concentration.

The flow chart in FIG. 5 shows a routine 500 for estimating $NO_x$ concentration of a $NO_x$ sensor, such as the $NO_x$ sensor illustrated in FIGS. 2 and 3. Specifically, routine 500 determines if the generated $NO_x$ concentration is indicative of an amount of $NO_x$ in the exhaust gases or if it is an offset of the $NO_x$ sensor based on the position of the bypass valve.

At 510 of routine 500, it is determined if a vehicle key-on event has occurred. Key-on may occur under cold start conditions after a long vehicle soak time or under conditions in which the key was off for a short period of time and the engine is still warm. If, instead, it is a vehicle key-off event, the bypass valve should be opened at 512. As will be described later with respect to FIG. 7, having the bypass valve open during key-off may be advantageous for subsequent key-on events.

If it is determined that a vehicle key-on event has occurred at 510, engine operating conditions are determined at 514 of routine 500 in FIG. 5. The engine operating conditions may include, but are not limited to, exhaust gas temperature and vehicle speed.

Once the operating conditions are determined, it is determined if the bypass valve is open at 516. A configuration in which the bypass valve is open is illustrated in FIG. 3. In such a configuration, the bypass valve is in the completely open state and the auxiliary valve is in the completely closed state; therefore, exhaust gases are prevented from entering the auxiliary branch and only ram air (e.g., ambient air) can flow past the exhaust gas sensor (e.g., $NO_x$ sensor) located in the auxiliary branch.

When the bypass valve is open, the $NO_x$ sensor located in the auxiliary branch of the exhaust pipe is operated as a $NO_x$ sensor in a first mode of operation at 518 of routine 500 in FIG. 5. As such, a concentration of $NO_x$ in the air flowing past the sensor (e.g., an ambient $NO_x$ amount) is determined at 520. Since the air flowing past the sensor in this configuration is ram air, the $NO_x$ concentration will correspond to the concentration of $NO_x$ in ambient air (e.g., 0 ppm $NO_x$). A generated $NO_x$ concentration that differs from the ambient $NO_x$ concentration, however, is indicative of an offset of the $NO_x$ sensor. Thus, a $NO_x$ offset based on the ambient $NO_x$ amount determined at 520 is determined at 522 of routine 500.

In some examples, such as when a $NO_x$ offset is determined periodically throughout a drive cycle, there may be a delay after the auxiliary valve is closed and the bypass valve is opened before an accurate $NO_x$ offset can be determined. The delay, or time to generate the sensor offset, may be based on the speed of the vehicle as the ram air flow amount and velocity are dependent on the vehicle speed. For example, if the vehicle is travelling at a low speed (e.g., 5 mph), the amount of ram air that is scooped into the bypass, as well as the velocity of the ram air, is small compared to an instance in which the vehicle is travelling at a high speed (e.g., 60 mph). Thus, the time it takes to flush residual exhaust gases out of the auxiliary branch will be longer when the vehicle speed is low resulting in a delay before an accurate $NO_x$ offset can be generated.

Further, in some embodiments, the controller may trigger the valve actuator to open the bypass valve only if the vehicle speed is above a threshold speed. In this way, a sensor offset is generated only when a sufficient ambient airflow may be provided to the bypass and auxiliary branch of the exhaust pipe in order to reduce the time for generating the offset of the $NO_x$ sensor.

In still other embodiments, the offset may be based on a projected equilibrium of the sensor if the offset is generated during a time when the vehicle is travelling below a threshold speed and the bypass valve is not open long enough for the ambient air to reach a steady state in the auxiliary branch of the exhaust pipe (e.g., vicinity of the sensor).

Continuing with the flow chart in FIG. 5, at 524 of routine 500, the offset of the $NO_x$ sensor may be adjusted based on the offset generated at 522. For example, the sensor may have an existing offset that may have been generated when the sensor was manufactured, during a previous drive cycle, or during a preceding determination of the sensor offset during the same drive cycle. If the offset generated at 522 is different from the existing offset of the sensor, then the $NO_x$ offset is adjusted to reflect the new offset at 524.

Referring back to 516, if it is determined that the bypass valve is not open, routine 500 moves to 526 where the exhaust gas sensor is operated as a $NO_x$ sensor in a second mode of operation. A configuration in which the bypass valve is not open, illustrating the second mode of operation, is shown in FIG. 2. In this configuration, the bypass valve is in the completely closed state and the auxiliary valve is in the completely open state. As such, exhaust gases are permitted to flow into the auxiliary branch and past the $NO_x$ sensor. Thus, the sensor is operated as a $NO_x$ sensor to determine an exhaust $NO_x$ amount.

At 528 of routine 500 in FIG. 5, an exhaust $NO_x$ concentration is determined based on the adjusted offset of the sensor generated at 524 (or the existing offset of the sensor, if the offset was not adjusted). For example, the offset of the sensor is subtracted from the exhaust $NO_x$ concentration generated at 528 resulting in an accurate indication of the amount of $NO_x$ in the exhaust gas.

The exhaust $NO_x$ concentration determined at 528, may be utilized for a variety of purposes. As one example, at 530 of routine 500, the $NO_x$ concentration is used as a feedback control for an amount of a reductant (e.g., urea) dispensed by a selective catalyst reduction (SCR) system. In at least one condition, if the $NO_x$ concentration is too high, the SCR may be triggered to increase the amount of urea dispensed in order to decrease the amount of $NO_x$ in the vehicle emissions. As another example, the $NO_x$ concentration determined at 528 may be used by the controller for on board diagnostics (OBD) of the exhaust aftertreatment system. An amount of $NO_x$ that is too high or too low may indicate degradation of one or more components of the aftertreatment system.

As described above, the position of the bypass valve determines the constituents of the air stream flowing past the exhaust gas sensor located in the auxiliary branch of the exhaust pipe. If the bypass valve is in the completely open state, ram air (e.g., ambient air) flows past the $NO_x$ sensor and the sensor operates in a first mode to generate a $NO_x$ offset. If the bypass valve is in the completely closed state, exhaust gas flows past the $NO_x$ sensor and the sensor operates in a second mode to determine an exhaust $NO_x$ concentration. In addition to generating a $NO_x$ offset, the $NO_x$ sensor may also be employed to determine a gain of an oxygen (e.g., $O_2$) signal, as will be described below with respect to FIG. 6.

Figure 6:
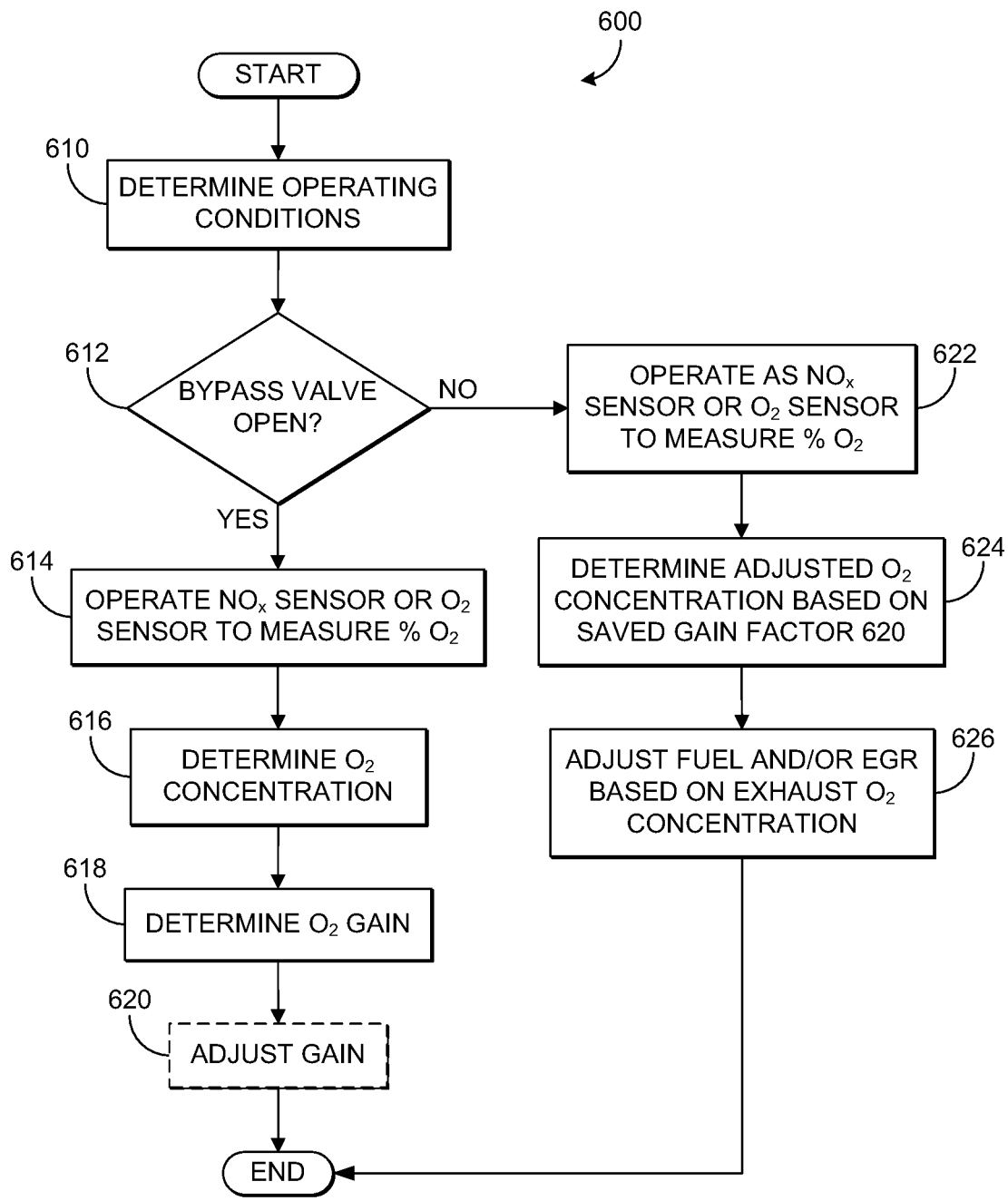
FIG. 6 shows a flow chart illustrating a routine for estimating $O_2$ gain.

The flow chart in FIG. 6 depicts a routine 600 for estimating an amount of $O_2$ and generating a gain of the $NO_x$ sensor or oxygen ($O_2$) sensor. Specifically, the routine determines the operating mode of the sensor based on the state of the bypass valve (e.g., completely open or completely closed) and a gain of the $O_2$ signal from the $NO_x$ sensor is generated based on a concentration of oxygen measured by the sensor.

At 610 of routine 600 in FIG. 6, engine operating conditions are determined. Such operating conditions may include, but are not limited to, exhaust gas temperature and vehicle speed.

Once the operating conditions are determined, it is determined if the bypass valve is open at 612. If it is determined at 612 that the bypass valve is in the completely open state, an example of which is illustrated in FIG. 3, routine 600 moves to 614 of FIG. 6.

At 614 of routine 600, the $NO_x$ sensor or $O_2$ sensor is operated to measure the $O_2$ concentration of the ram air that is allowed to flow past the sensor when the bypass valve is in the completely open state. The ambient $O_2$ concentration may be generated at 616 of routine 600 before or after the $NO_x$ concentration is generated at 520 of routine 500 in FIG. 6.

At 618 of routine 600 in FIG. 6, a gain of the $NO_x$ sensor or $O_2$ sensor is generated based on the $O_2$ concentration determined at 616. In some embodiments, a gain of the % $O_2$ sensor may be generated at 618 every time an offset of the $NO_x$ sensor is generated at 522 of FIG. 5. In other embodiments, a gain may not be generated every time an offset is generated. In further embodiments, a gain of the $O_2$ signal may be generated while the bypass valve is open and an offset of the $NO_x$ concentration may not be generated.

As described above with respect to the $NO_x$ offset of the sensor, the amount and velocity of the ram air flow is dependent on the vehicle speed. Thus, a gain of the $NO_x$ sensor may be generated based on the vehicle speed. For example, if the vehicle speed is low (e.g., 5 mph), the gain may be determined based on a projected equilibrium of the sensor.

After a gain of the sensor is generated at 618, the gain of the sensor may be adjusted at 620 of routine 600. For example, the sensor may have an existing gain that differs from the gain generated at 618. In such a situation, the existing gain of the sensor is adjusted to reflect the new gain in order to maintain accuracy of the output of the $NO_x$ sensor.

If it is determined that the bypass valve is not open at 612, i.e., it is in the completely closed state, routine 600 advances to 622 where the sensor is operated as a $NO_x$ sensor in a second mode of operation to determine an exhaust % $O_2$ concentration. As stated above, FIG. 2 shows an example of the bypass valve in the completely closed state in which exhaust gas is able to flow through the auxiliary branch of the exhaust pipe. At 624, an adjusted $O_2$ concentration of the $NO_x$ sensor or $O_2$ sensor is determined based on the saved gain factor from 620. At 626 of routine 600, an engine operating parameter may be adjusted based on the adjusted $O_2$ concentration. For example, an amount of fuel injected into one or more cylinders and/or an amount of exhaust gas recirculation (EGR) may be adjusted in order to maintain a desired air-fuel ratio.

The above-described methods provide a way to obtain accurate indications of the ppm $NO_x$ offset and % $O_2$ gain of a $NO_x$ sensor (or other exhaust gas sensor) located downstream of a $NO_x$ catalyst such as an SCR. By positioning the sensor in a valved auxiliary branch of an exhaust passage downstream of the catalyst, the auxiliary branch including a valved bypass, the sensor can be exposed to ambient air that has not passed through the engine. Such a configuration, in addition to increasing the accuracy of gain and offset measurements, may also decrease the time before a sensor heater activation and increase the lifetime of the sensor, as will be described with reference to FIGS. 7 and 8.

Figure 7:
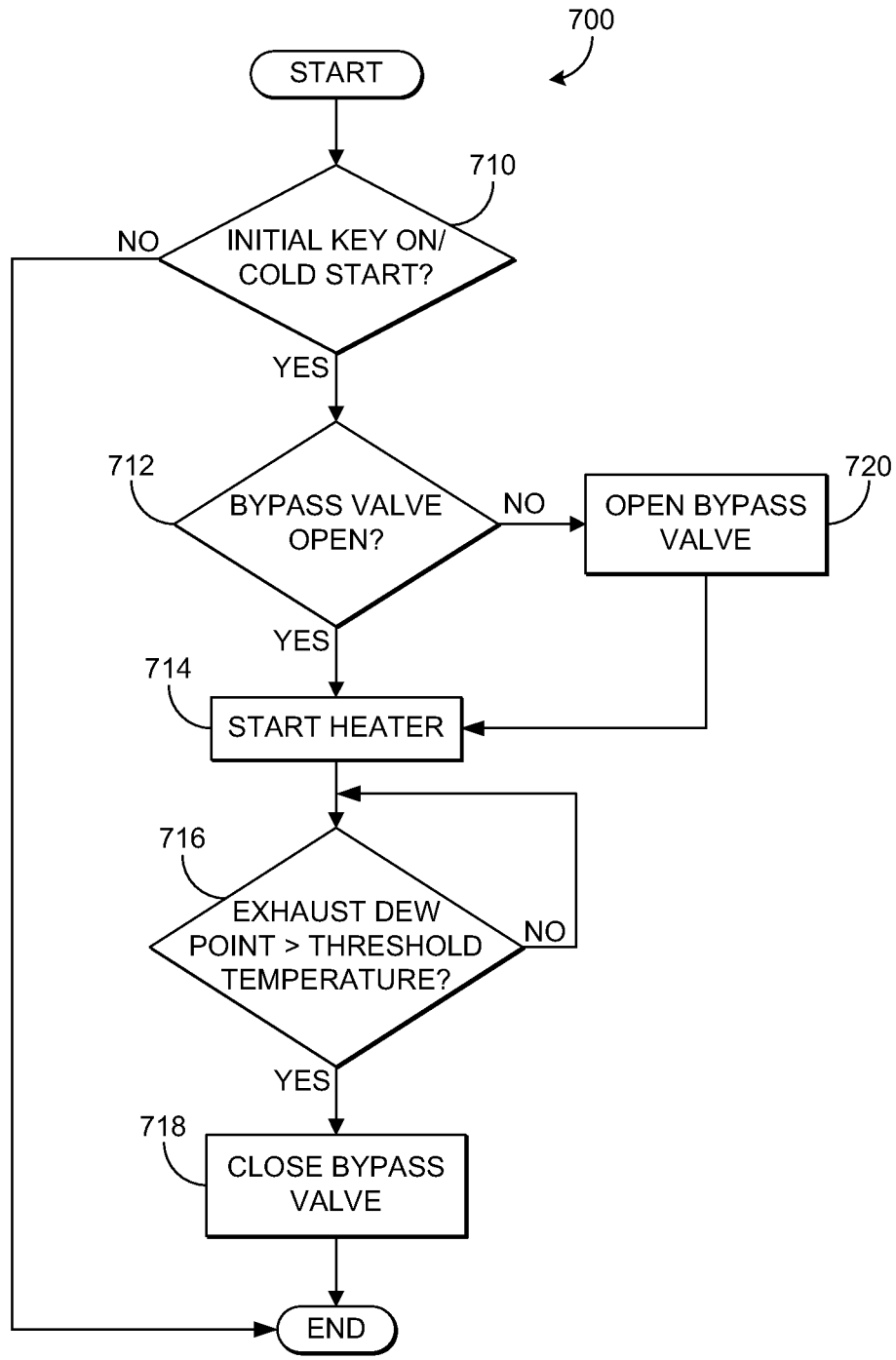
FIG. 7 shows a flow chart illustrating a heater control routine.

The flow chart in FIG. 7 illustrates a routine 700 for controlling a $NO_x$ sensor heater during a cold engine start. Specifically, the routine controls the heater at cold start based on the position of the bypass valve. In this way, the heater can be started earlier than in a situation in which there is no valved bypass.

At 710 of routine 700 in FIG. 7, it is determined if a key-on event under cold start conditions has occurred. If a key-on event occurs and the engine is already warm, routine 700 may not be necessary and the routine ends. In the case of a cold start, routine 700 proceeds to 712.

It is determined if the bypass valve is open at 712 of routine 700. If the bypass valve is in the completely closed state, routine 700 advances to 720 where the valve actuator is instructed to move the bypass valve to the completely open state, thereby completely closing the auxiliary valve. If it is determined that the bypass valve is open at 712, routine 700 proceeds to 714 where the $NO_x$ sensor heater is started. Similarly, once the bypass valve is opened at 720, the routine continues to 714 where the heater is started.

An example of the configuration in which the bypass valve is in the completely open state and the auxiliary valve is positioned in the completely closed state is illustrated in FIG. 3. As previously stated, in this configuration, exhaust gases produced during combustion in the cylinders of the engine are prevented from flowing through the auxiliary branch of the exhaust pipe, and ambient air from outside the vehicle that has circumvented the engine is scooped into bypass and is able to flow past the $NO_x$ sensor in the auxiliary branch.

Once it is determined that the bypass valve is in the completely open state, the $NO_x$ sensor heater is activated at 714 of routine 700 in FIG. 7. Under conditions in which there is no valved bypass to control the air stream flowing past the sensor, the heater is not started until a temperature that matches a dew point temperature of the exhaust gas has been reached in the vicinity of the exhaust gas sensor. In this manner, the sensor is protected from a thermal shock due to a fast warm-up rate. On the other hand, with the inclusion of a valved bypass, the sensor heater may be started at key-on if the bypass valve is open, as the sensor is exposed to ambient air rather than exhaust gas. Thus, as mentioned earlier, it is advantageous to open the bypass valve during a key-off event so that the bypass valve is open during a subsequent key-on event and the sensor heater can start right away.

In one example, before an engine start, the routine provides exposing the exhaust gas sensor to ambient air both upstream and downstream of the sensor; and upon an engine start, activating the sensor heater to heat the sensor even if temperature of combusted exhaust gas from the engine start is below a dew point temperature of the combusted exhaust gas while maintaining exposure of the exhaust gas oxygen sensor to ambient air both upstream and downstream of the sensor. As noted herein, the sensor may be a $NO_x$ sensor, and the exposing may include exposing the exhaust gas sensor to ambient air upstream via a valved bypass that leads to ambient air without passing through cylinders of the engine, and exposing the exhaust gas sensor to ambient air downstream via a tailpipe.

Furthermore, if the bypass valve is in the completely open state at key-on, a sensor offset and/or gain may be generated and the existing offset and/or gain may be adjusted accordingly. As such, the sensor may obtain accurate $NO_x$ and $O_2$ readings from the time it begins generating exhaust gas constituent readings during a drive cycle.

Moving on, routine 700 proceeds to 716 after the sensor heater is started. At 716, it is determined if the exhaust dew point is greater than a threshold temperature. Below the threshold temperature, it is possible the exhaust gas may contain water droplets that may be harmful to the sensor. Once the exhaust dew point reaches a threshold temperature, the bypass valve is closed at 718 of routine 700 in FIG. 7 and the $NO_x$ sensor may begin generating indications of exhaust $NO_x$ and $O_2$ concentrations.

Therefore, the sensor heated may be started at key-on rather than waiting until a certain temperature in the vicinity of the exhaust gas sensor has been reached. In addition to reducing the heater start time, the life of the sensor may be extended by protecting the sensor from a fast warm-up rate and water droplets in the exhaust. The lifetime of the sensor may be further extended as a result of the valve control routine depicted in FIG. 8.

Figure 8:
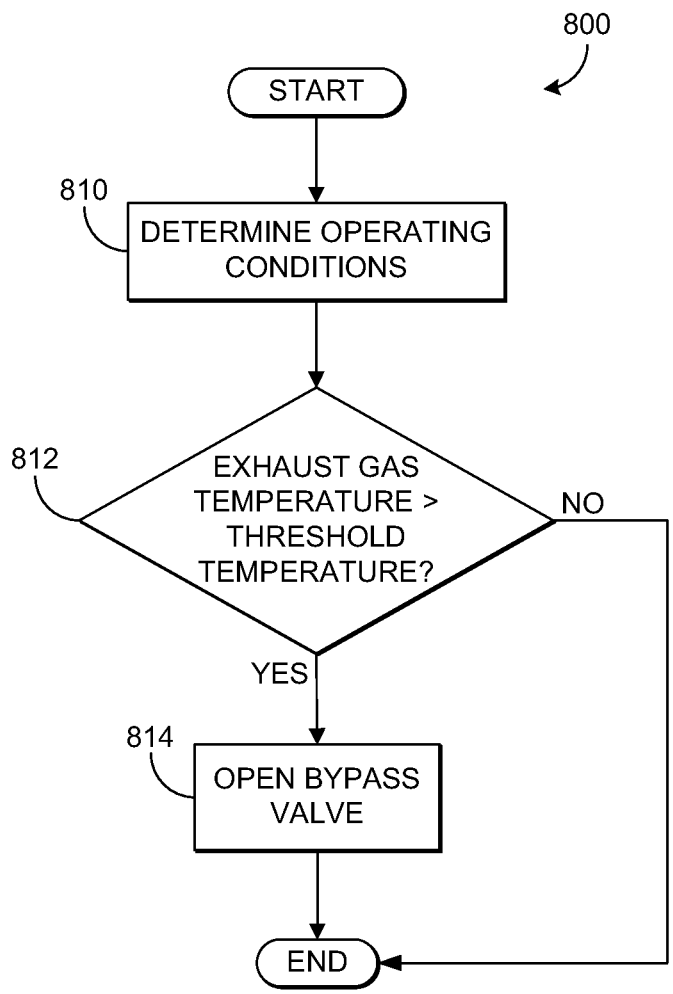
FIG. 8 shows a flow chart illustrating a valve control routine based on temperature.

The flow chart in FIG. 8 shows a control routine 800 for controlling the dual valve based on temperature in the vicinity of the $NO_x$ sensor. In particular, the routine controls the valves in manner in which the sensor is protected from overheating during a period in which the sensor is exposed to exhaust gas.

At 810 of routine 800 in FIG. 8, the engine operating conditions are determined. The operating conditions may include, but are not limited to, exhaust gas temperature and engine speed.

At 812 of routine 800, it is determined if the exhaust gas temperature is above a threshold temperature. If the exhaust gas temperature has not exceeded the threshold temperature, the valve positions are not changed. For example, the bypass valve remains in the completely closed state and the auxiliary valve remains in the completely open state. If, however, the exhaust gas temperature is above the threshold temperature, the valve actuator is instructed to move the bypass valve to the completely open state and the auxiliary valve to the completely closed state at 814 of routine 800. In this way, the exhaust gas sensor is removed from the exhaust stream and, thus protected from the increased temperature of the exhaust gas.

As discussed above, an exhaust passage of a motor vehicle may be divided into a main branch and an auxiliary branch downstream of a catalyst. The auxiliary branch may include a valved bypass that allows ram air to flow through the auxiliary branch where an exhaust gas sensor is located. Because the ram air is absent of combustion products, accurate sensor gain and offset indications may be generated during periods when the bypass valve is in the completely open state and the sensor is exposed to ambient air. Furthermore, by controlling the air stream that flows past the $NO_x$ sensor, the lifetime of the sensor may be extended.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The technology can be applied to any exhaust gas sensor that is in any combusted exhaust gas. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. An engine control method, comprising:
   before an engine start, exposing an exhaust gas sensor having a heater coupled in an engine exhaust system to ambient air both upstream and downstream of the sensor;
   upon the engine start, activating the sensor heater to heat the sensor even if temperature of combusted exhaust gas from the engine start is below a dew point temperature of the combusted exhaust gas while maintaining exposure of the sensor to ambient air both upstream and downstream of the sensor, including exposing the sensor to ram air circumventing the engine.

2. The method of claim 1 wherein the sensor is an $O_2$ sensor.

3. The method of claim 1 wherein the sensor is a $NO_x$ sensor, and wherein the exposing includes exposing the sensor to the ram air via a valved bypass that leads to ram air without passing through cylinders of the engine, and exposing the sensor to ambient air downstream of the sensor via a tailpipe, where the valved bypass directs combusted exhaust gas from the engine start to bypass the sensor while the heater is activated until the exhaust gas dew point is above a threshold temperature.

4. The method of claim 3, further comprising:
   generating an offset of the sensor after a delay from switching from combusted exhaust gas to ram air flowing past the sensor, the delay being decreased with increased speed of a vehicle driven by the engine;
   adjusting an output of the sensor based on the sensor offset; and
   adjusting urea injection based on the adjusted sensor output.

5. The method of claim 3 further comprising, once the exhaust gas dew point is above the threshold temperature, controlling the valved bypass to expose the sensor to combusted exhaust gas from the engine while not exposing the sensor to the ram air.

6. The method of claim 5 further comprising:
   while the sensor is exposed to the ram air, identifying an ambient $NO_x$ amount based on output from the $NO_x$ sensor; and
   while the sensor is exposed to the combusted exhaust gas, identifying an exhaust $NO_x$ amount based on output from the $NO_x$ sensor.

7. The method of claim 6 wherein the ambient $NO_x$ amount is an offset of the $NO_x$ sensor, and wherein the exhaust $NO_x$ amount is based on the sensor offset.

8. An engine control method, comprising:
   before engine start, exposing an exhaust $NO_x$ sensor having a heater to ambient air both upstream and downstream of the sensor;
   upon engine start, activating the heater to heat the sensor even if combusted engine exhaust gas temperature is below an exhaust dew point, while maintaining exposure of the sensor to ambient air both upstream and downstream of the sensor including exposing the sensor to ram air circumventing the engine; and
   adjusting urea injection responsive to the sensor.

9. An engine control method, comprising:
   before engine start, exposing an exhaust $NO_x$ sensor having a heater to ambient air both upstream and downstream of the sensor;
   upon engine start, activating the heater to heat the sensor even if combusted engine exhaust gas temperature is below an exhaust dew point, while maintaining exposure of the sensor to ambient air both upstream and downstream of the sensor,
   once the exhaust gas dew point is above a threshold temperature, exposing the sensor to combusted exhaust gas from the engine and not exposing the sensor to ambient air upstream of the sensor; and
   adjusting urea injection responsive to the sensor.

* * * * *